(12) United States Patent
Ali et al.

(10) Patent No.: US 8,611,467 B2
(45) Date of Patent: Dec. 17, 2013

(54) DC OFFSET CORRECTION TECHNIQUES

(75) Inventors: Isaac Ali, Bristol (GB); Nicholas P. Cowley, Wroughton (GB)

(73) Assignee: Intel Corporation, Santa Clara, CA (US)

( * ) Notice: Subject to any disclaimer, the term of this patent is extended or adjusted under 35 U.S.C. 154(b) by 398 days.

(21) Appl. No.: 12/790,344

(22) Filed: May 28, 2010

(65) Prior Publication Data

US 2011/0293043 A1 Dec. 1, 2011

(51) Int. Cl.
*H04L 25/06* (2006.01)
(52) U.S. Cl.
USPC .......................................................... 375/319
(58) Field of Classification Search
USPC .......................................... 375/343, 319, 324
See application file for complete search history.

(56) References Cited

U.S. PATENT DOCUMENTS

| | | | | |
|---|---|---|---|---|
| 5,150,082 A | * | 9/1992 | Grimmett et al. | 332/128 |
| 6,356,217 B1 | * | 3/2002 | Tilley et al. | 341/118 |
| 2003/0179774 A1 | * | 9/2003 | Saidi et al. | 370/468 |
| 2004/0228424 A1 | * | 11/2004 | Baldwin et al. | 375/343 |
| 2005/0054362 A1 | * | 3/2005 | Panpaliya et al. | 455/522 |
| 2006/0077006 A1 | * | 4/2006 | Hunton et al. | 330/151 |
| 2007/0111688 A1 | * | 5/2007 | Ueno et al. | 455/130 |
| 2008/0041953 A1 | * | 2/2008 | Frederick et al. | 235/451 |
| 2009/0261918 A1 | * | 10/2009 | Walkington | 332/103 |

* cited by examiner

*Primary Examiner* — Jaison Joseph
(74) *Attorney, Agent, or Firm* — Sutherland, Asbill & Brennan LLP (57) ABSTRACT

Techniques are disclosed that involve the reduction of DC offsets. For instance, embodiments may receive a baseband signal, and determine a DC characteristic of the baseband signal. When the DC characteristic has a value that is outside of a predetermined range, a correction signal is adjusted. The correction signal is injected into the baseband signal.

20 Claims, 9 Drawing Sheets

DC OFFSET CORRECTION TECHNIQUES

BACKGROUND

Devices, such as receivers and tuners, commonly employ signal architectures that generate a baseband signal stream having a spectrum that is centered at or near direct current (DC). In turn, these devices typically perform further processing on the baseband signal.

Unfortunately, such baseband signals may exhibit DC offsets. These offsets may be caused by factors, such as the inherent nature of electronic circuits (e.g., component matching), as well as the employed processing architecture. For example, commutating signals employed with mixer circuitry can self-mix and generate DC components. Such effects will vary with operational parameters, such as gain, frequency, process, temperature, and so forth.

Due to the random nature of received signals, there is often a DC component associated with demodulated signals that is time varying in dependence on the employed modulation technique. On average, the measured DC signal component will tend to be zero as the measurement period increases. However, the measurement periods corresponding to such zero averages are typically long.

DC offsets are detrimental to the proper functioning of devices, such as receivers and tuners. For example, such offsets can contribute to unacceptable bit error rates.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION

Embodiments provide techniques that reduce DC offsets. Such offsets are commonly inherent in signal processing architectures that generate baseband data signals. One such architecture is the Weaver architecture, which is attractive for its ability to reject image channels. For instance, embodiments may receive a baseband signal, and determine a DC characteristic of the baseband signal. When the DC characteristic has a value that is outside of a predetermined range, a correction signal is adjusted. The correction signal is injected into the baseband signal.

Conventional DC offset reduction techniques introduce a null at DC (e.g., through the employment of high pass filter(s)). Unfortunately, the introduction of a null will also partially remove the data signal. In contrast, embodiments may detect actual DC characteristics of baseband signals. From this, correction signals may be generated that do not introduce a null at DC.

As described above, conventional DC offset reduction techniques involve the introduction of a null at DC. However, such techniques need to have very slow response times to minimize the removal of information and minimize inter-symbol interference. As an example, for 256 quadrature amplitude modulation (QAM) at a 6 mega symbol per second (MS/s) modulation rate, the DC null should be at a relatively low bandwidth (e.g., less than 100 Hz) to minimize implementation loss. In conflict with this, however, are actual system needs for a fast response time (e.g., significantly greater than 100 Hz). Embodiments may advantageously overcome such conflicting needs, for example, through the generation and injection of correction signals.

Figure 1:
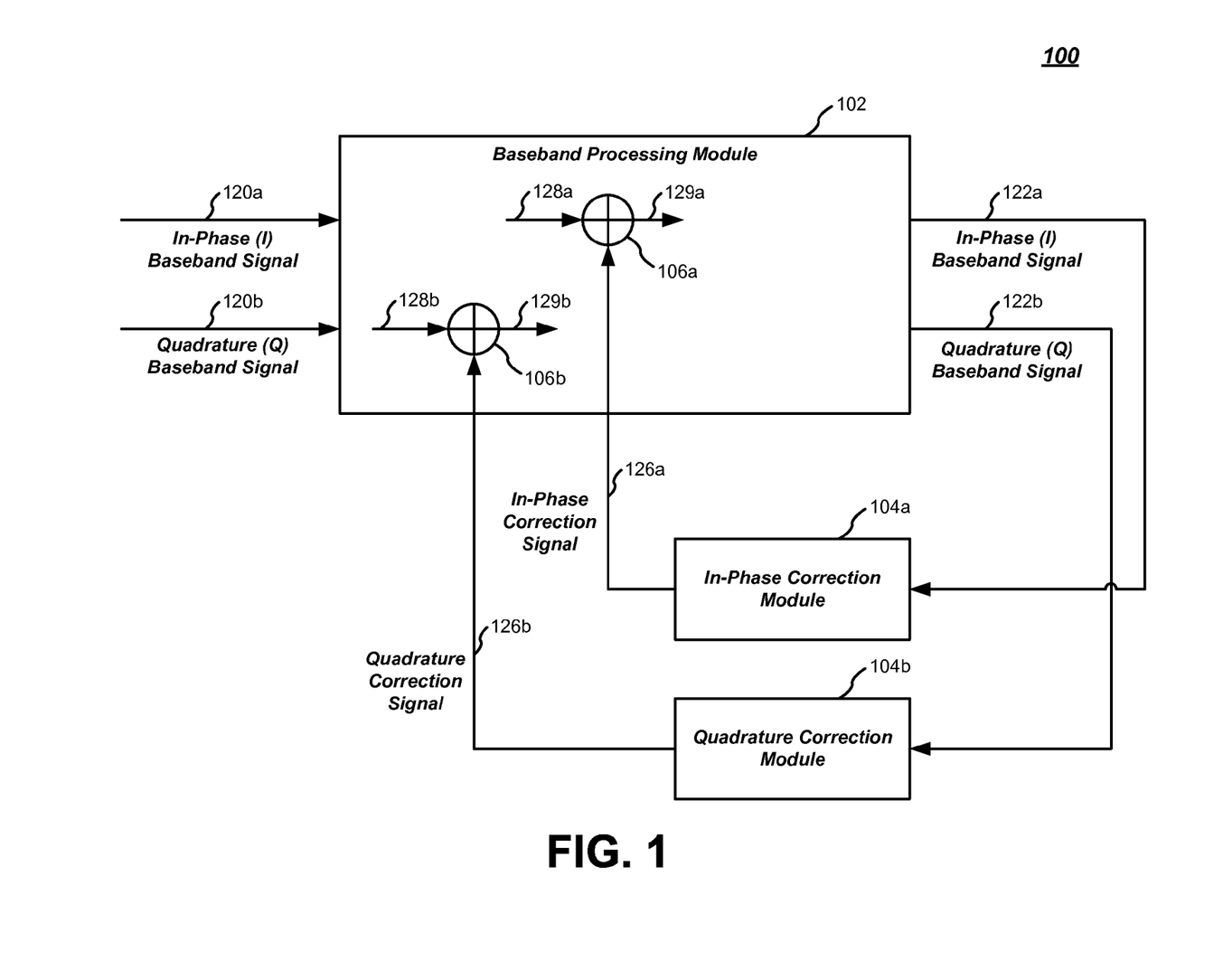
FIG. 1 is a diagram of an exemplary apparatus.

FIG. 1 is a diagram of an exemplary apparatus 100. Apparatus 100 includes a baseband processing module 102, an in-phase correction module 104a and a quadrature correction module 104b. These elements may be implemented in any combination of hardware and/or software.

In embodiments, baseband processing module 102 receives one or more input baseband signals. For example, FIG. 1 shows baseband processing module 102 receiving an in-phase (I) baseband signal 120a, and a corresponding quadrature (Q) baseband signal 120b. Signals 120a and 120b may be received from various elements. For example, these signals may be received from an element (such as a tuner) that generates baseband signals 120a and 120b from a higher frequency signal (e.g., an RF signal).

From these signals, baseband processing module 102 produces corresponding output baseband signals. In particular, FIG. 1 shows baseband processing module 102 producing an in-phase baseband signal 122a and a quadrature baseband signal 122b.

In generating signals 122a and 122b, baseband processing module 102 may perform one or more operations, such as the injection of first and second correction signals 126a-b into baseband signals 122a-b, respectively. This injection may involve combining (e.g., summing) correction signals 126a-b with corresponding signals within baseband processing module 102. Through this feature, DC offsets within signals 122a and 122b may be advantageously reduced.

For instance, FIG. 1 shows an in-phase baseband signal 128a being summed with first correction signal 126a at a summation node 106a. This produces in-phase baseband signal 129a. Similarly, FIG. 1 shows a quadrature baseband signal 128b being summed with second correction signal 126b at a summation node 106b. This produces quadrature baseband signal 129b.

In embodiments, baseband signals 128a-b and 129a-b may be intermediate signals generated within baseband processing module 102 pursuant to the production of signals 122a-b. However, embodiments are not limited to this. For example, signals 128a-b may be signals 120a-b, respectfully. Additionally or alternatively, signals 129a-b may be signals 122a-b, respectfully. An exemplary implementation of baseband processing module 102 is described below with reference to FIG. 4.

As described above, correction signals 126a and 126b provide for the reduction of DC offsets within baseband signals 122a and 122b, respectively. FIG. 1 shows that in-phase correction module 104a generates correction signal 126a, while quadrature correction module 104b generates correction signal 126b. In embodiments, correction signals 126a and 126b correspond to DC characteristics of signals 122a and 122b that are determined by correction modules 104a and 104b, respectively.

Figure 2:
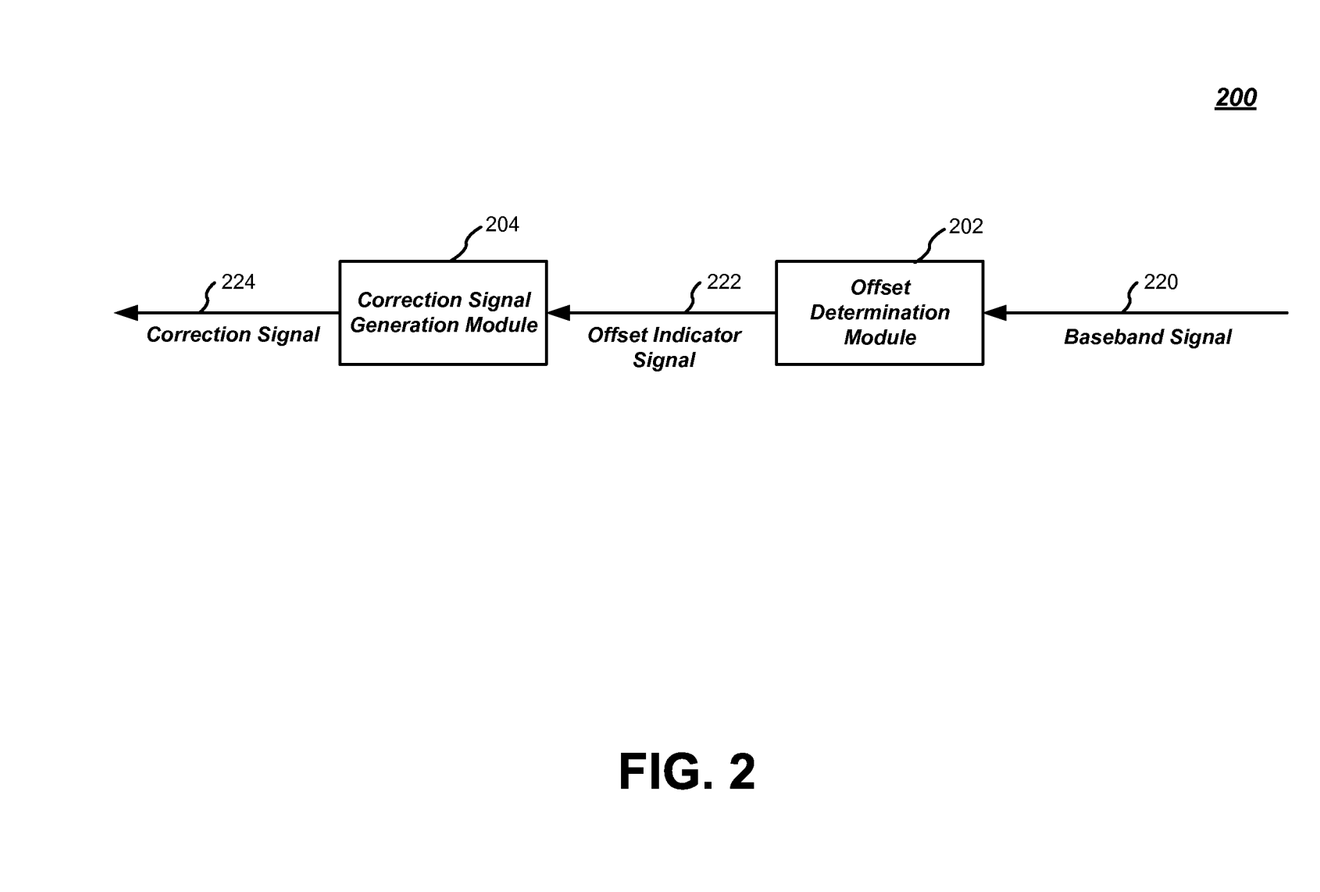
FIGS. 2 and 3 are diagrams of exemplary correction module implementations.

FIG. 2 is a diagram showing an exemplary implementation 200 that may be employed in one or both of correction modules 104a and 104b. This implementation, however, is not limited to the context of FIG. 1. As shown in FIG. 2, this implementation includes an offset determination module 202 and a correction signal generation module 204. These elements may be implemented in any combination of hardware and/or software.

As shown in FIG. 2, offset determination module 202 receives a baseband signal 220. In the context of FIG. 1, baseband signal 220 may be one of baseband signals 122a-b (received from baseband processing module 102). From baseband signal 220, offset determination module 202 determines one or more DC offset characteristics of baseband signal 220. Based on this determination, offset determination module 202 generates an offset indicator signal 222, which is sent to correction signal generation module 204.

Based on offset indicator signal 222, correction signal generation module 204 generates a correction signal 224, which is injected into baseband signal 220. This injection may involve combining (e.g., summing) correction signal 224 with a baseband signal from which baseband signal 220 is derived. For example, in the context of FIG. 1, correction signal 220 may be implemented as either first correction signal 126a or second correction signal 126b. As a result of this injection, a DC offset of baseband signal 220 may be advantageously reduced.

Figure 3:
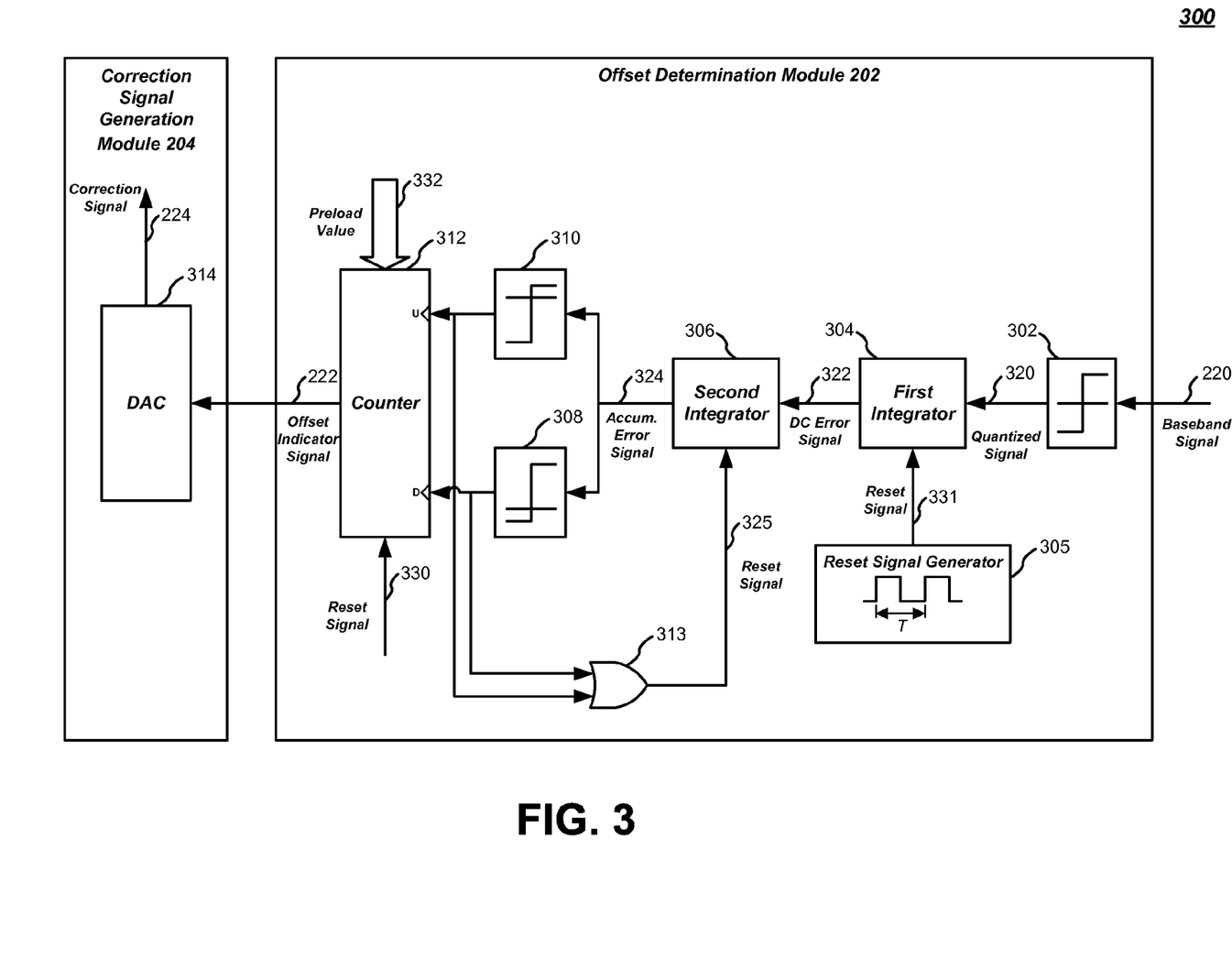

FIG. 3 is a diagram showing exemplary implementations of offset determination module 202 and correction signal generation module 204. These implementations are shown for purposes of illustration, and not limitation.

As shown in FIG. 3, the exemplary implementation of offset determination module 202 includes a comparator 302, a first integrator 304, a second integrator 306, comparators 308 and 310, and a counter 312.

Comparator 302 receives baseband signal 220 and generates a corresponding quantized signal 320. In embodiments, comparator 302 may operate as a clocked 1-bit quantizer More particularly, comparator 302 may produce a first signal value (e.g., a negative value) when baseband signal 220 has a negative value, and a second signal value (e.g., a positive value) when baseband signal 220 has a non-negative value.

First integrator 304 integrates quantized signal 320 over an integration time, T (also referred to herein as the measurement period). The result of this integration may be scaled by a coefficient, k. This integration produces a DC error signal 322, which is equal to or proportional to an average value of baseband signal 220 during the integration time.

In accordance with this feature, FIG. 3 shows first integrator 304 being reset (e.g., cleared or nulled) by a reset signal 331. Reset signal 331 may be generated by a signal generator 305. More particularly, FIG. 3 shows signal generator 305 generating a square wave having a period T. Embodiments, however, are not limited to this implementation.

Baseband signal 220 has a random component. Likewise, DC error signal 322 (which is derived from baseband signal 220) also has a random component. More particularly, DC error signal 322 may have a variance that is dependent on the integration time employed by first integrator 304. For instance, as the integration time increases, the variance of DC error signal 322 may decrease.

Embodiments may manage the variance of DC error signal 322 by setting the integration time employed by first integrator 304. More particularly, embodiments may employ an integration time such that DC error signal 322 exhibits a well behaved (stable) and predictable variance.

Second integrator 306 accumulates (integrates) DC error signal 322. As a result, second integrator 306 generates an accumulated error signal 324. This accumulation occurs until accumulated error signal 324 has a large enough magnitude to cross one of two thresholds. As shown in FIG. 3, these thresholds are established by comparators 308 and 310. In particular, comparator 308 establishes a lower threshold, and comparator 310 establishes an upper threshold. In embodiments, these thresholds may be equal magnitude positive and negative values. However, thresholds of differing magnitudes may alternatively be employed.

FIG. 3 shows that counter 312 generates offset indicator signal 222. This generation involves counter 312 either increasing or decreasing the value of offset indicator signal 222 based on which threshold (of comparators 308 and 310) is crossed. For instance, counter 312 will increase its value (e.g., increment) when accumulated error signal 324 is greater than the upper threshold provided by comparator 310. In contrast, counter 312 will decrease its value (e.g., decrement) when accumulated error signal 324 is less than the lower threshold provided by comparator 308.

Each time counter 312 is adjusted, a reset operation occurs. More particularly, FIG. 3 shows that (through an OR gate 313) a reset signal 325 is generated whenever accumulated error signal 324 crosses either of the thresholds established by comparators 308 and 310. As shown in FIG. 3, reset signal 325 is provided to a reset terminal of second integrator 306. In turn, second integrator 306 resets (clears or nulls) the value of accumulated error signal 324. Thus, at each decision point, memory of the previous decision is removed.

Further, embodiments may employ dynamically adjustable step sizes. For instance, the incrementing magnitude and/or decrementing magnitude employed for counter 312 may be adjustable. As an example, if a predetermined number of consecutive decisions is made in a particular direction (e.g., a predetermined consecutive number of decrement decisions, or a predetermined consecutive number of increment decisions), then the employed step size may be increased. Additionally or alternatively, if predetermined number of alternating decisions is made (e.g., alternating between incrementing and decrementing), then the employed step size may be decreased.

Thus, embodiments may dynamically increase correction step sizes when DC errors become large. Conversely, embodiments may dynamically reduce correction step sizes when become small. This dynamic feature advantageously allows the effective response time to be changed as a function of the actual DC error present in baseband signal 220.

FIG. 3 further shows that counter 312 may receive a preload value 332, which establishes the value of counter 312. In embodiments preload value 332 may be employed at occasions, such as system activation. This may advantageously provide a faster convergence (a quicker DC offset reduction). Further, in embodiments, different preload values may be employed for different operational settings. For instance, preload value 332 may be set based on one or more operational characteristics (e.g., channel tunings, etc.).

Also, FIG. 3 shows that counter 312 may receive a reset signal 330. This signal causes the value of counter 312 to be cleared. In embodiments, reset signal 330 may be activated during an initialization process. For example, reset signal 330 may be activated upon an application of operational power.

As shown in FIG. 3, the exemplary implementation of correction signal generation module 106 includes a digital to analog converter (DAC) 314. DAC 314 generates analog correction signal 224 having a value that corresponds to the value of offset indicator signal 222. As described above, correction signal 224 may be injected into baseband signal 220 by combining (e.g., summing) it with a corresponding baseband signal (e.g., one of baseband signals 128a-b).

The implementation of FIG. 3 is shown for purposes of illustration and not limitation. Thus, other implementations may be employed. For instance, in alternative implementations, signal polarity can be reversed at various points (e.g., at comparator 302, at first integrator 304, and/or at second integrator 306). Such a polarity change switches the incrementing and decrementing operations performed by counter 312. For example, in an alternative implementation, comparator 302 performs the aforementioned quantization operations, as well as a polarity reversal. Accordingly, in this alternative implementation, the output of comparator 308 increments counter 312, and the output of comparator 310 decrements counter 310. Embodiments, however, are not limited to this alternative implementation.

Figure 4:
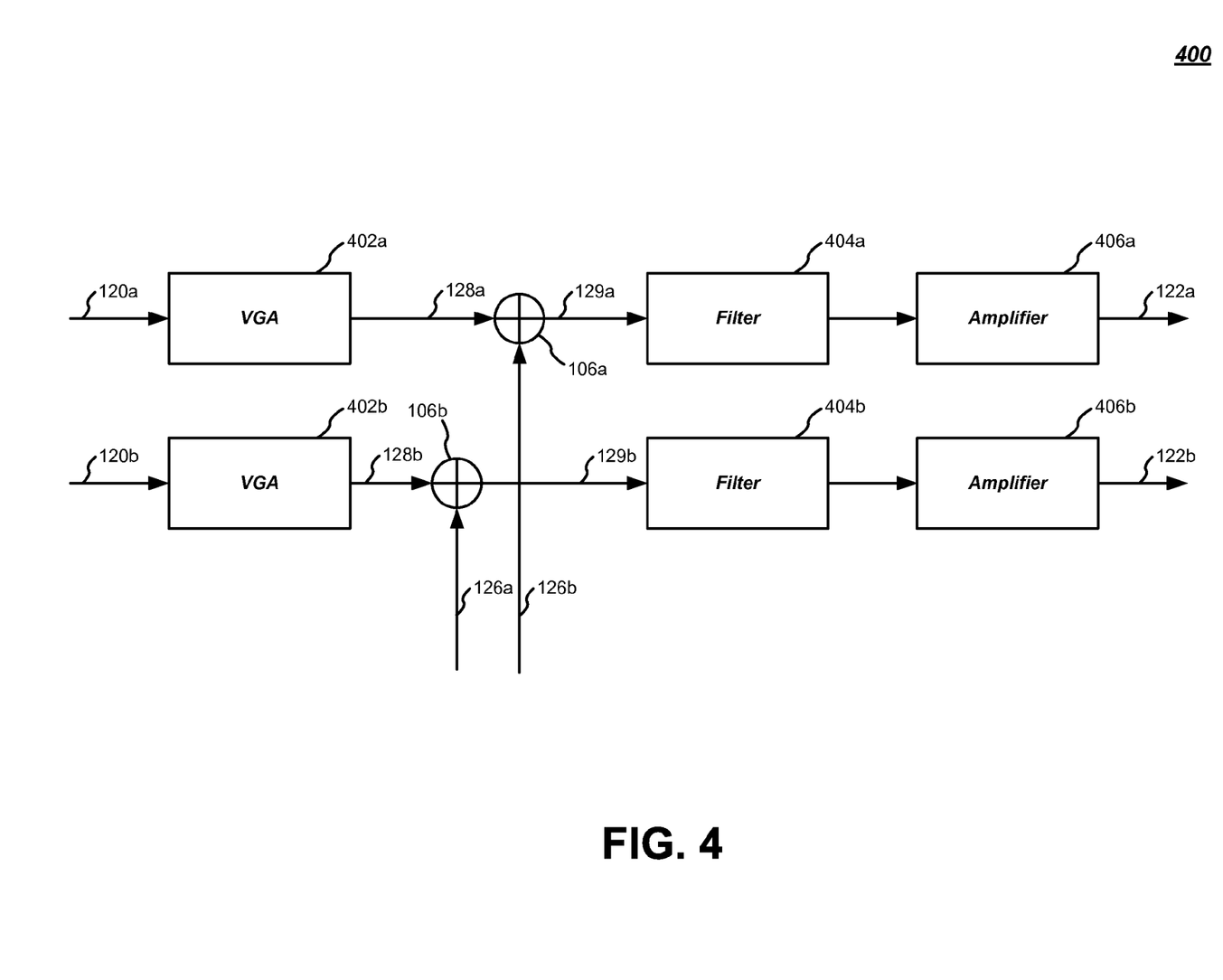
FIG. 4 is a diagram of an exemplary baseband processing module implementation.

FIG. 4 is a diagram showing an exemplary implementation 400 of baseband processing module 102. As shown in FIG. 4, this implementation includes variable gain amplifiers (VGAs) 402a-b, summation nodes 106a-b, filters 404a-b, and amplifiers 406a-b. This implementation is provided for purposes of illustration, and not limitation. Accordingly, other implementations may be employed.

As shown in FIG. 4, VGAs 402a and 402b receive baseband signals 120a and 120b, respectively. In turn, VGA 402a produces in-phase baseband signal 128a, while VGA 402b produces quadrature baseband signal 128b. As described above with reference to FIG. 1, in-phase baseband signal 128a is combined with first correction signal 126a at summation node 106a, thus producing in-phase baseband signal 129a. Similarly, quadrature baseband signal 128b is combined with second correction signal 126b at summation node 106b, thus producing quadrature baseband signal 129b.

Filters 404a-b each may be low pass filters. As shown in FIG. 4, in-phase baseband signal 129a is filtered by filter 404a, while quadrature baseband signal 129b is filtered by filter 404b. In turn, these filtered signals are amplified by amplifiers 406a and 406b to produce baseband signals 122a and 122b, respectively.

Figure 5:
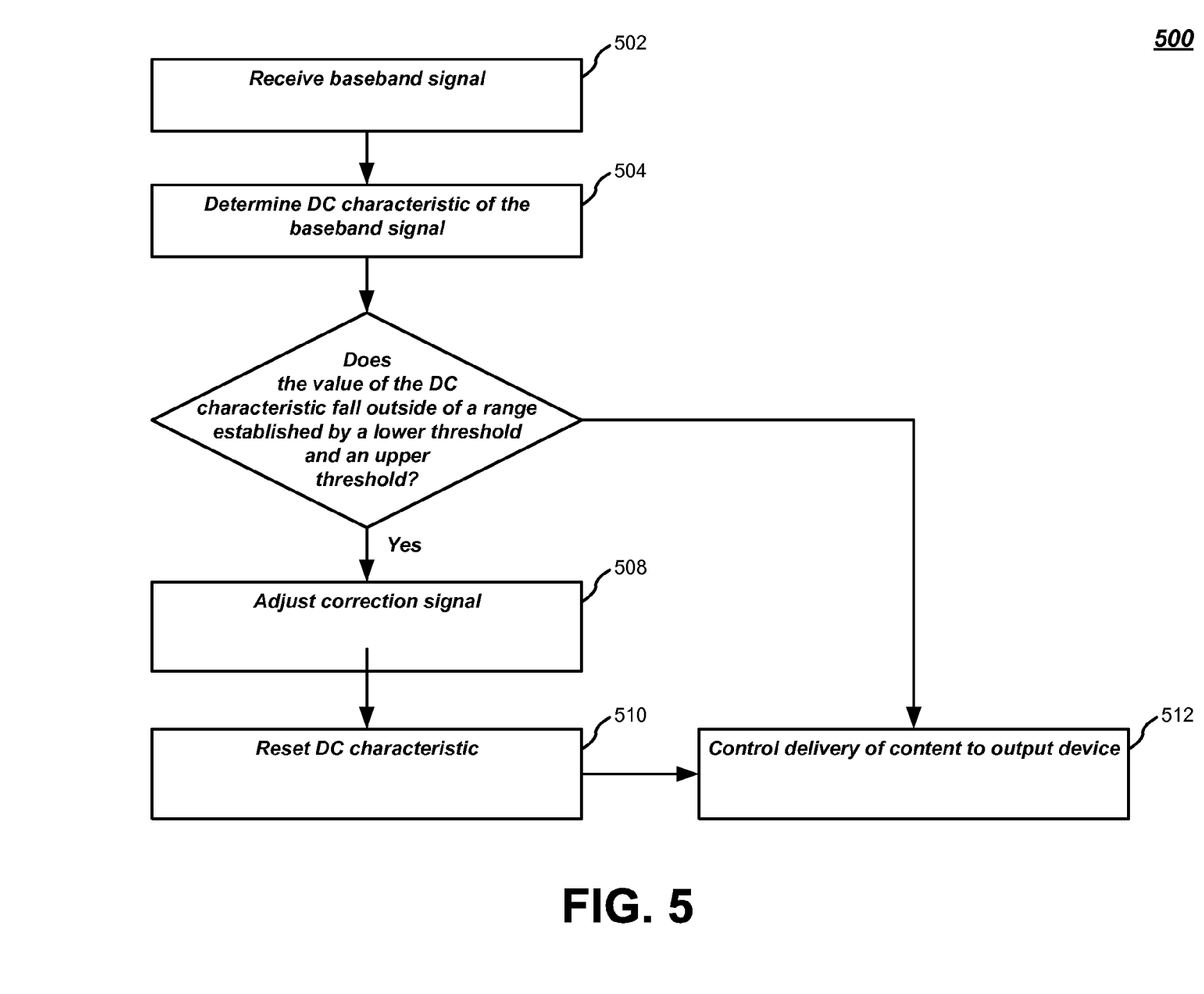
FIG. 5 is a logic flow diagram.

FIG. 5 illustrates an exemplary logic flow 500, which may be representative of operations executed by one or more embodiments described herein. Thus, this flow may be employed in the contexts of FIGS. 1-4. Embodiments, however, are not limited to these contexts. Also, although FIG. 5 shows particular sequences, other sequences may be employed. Moreover, the depicted operations may be performed in various parallel and/or sequential combinations.

At a block 502, a baseband signal is received. For example, in the context of FIG. 1, exemplary baseband signals include signals 122a and 122b.

A DC characteristic of the baseband signal is determined at a block 504. This DC characteristic may be the result of multiple integration stages. For instance, in the context of FIG. 3, the DC characteristic may be accumulated error signal 324. However, other DC characteristic forms may be employed.

At a block 506, it is determined whether the DC characteristic has a value that falls outside of a range established by a lower threshold and an upper threshold. If so then, operation proceeds to a block 508.

At block 508, a correction signal is adjusted. More particularly, the adjusting may involve increasing the correction signal's value when the DC characteristic is greater than the upper threshold, and otherwise decreasing the correction signal's value when the DC characteristic is less than the lower threshold.

FIG. 5 shows that a block 510 may follow block 508. At block 510, the DC characteristic value may be reset (e.g., nulled). As described herein, this feature provides for, at each decision, memory of the previous decision.

At a block 512, the correction signal is injected into the baseband signal. As described herein, this may involve combining (e.g., summing) the correction signal with a signal corresponding to the baseband signal. For example, in the context of FIG. 1, this may involve combining signals 126a and 128a, or combining signals 126b and 128b. Embodiments, however, are not limited to this context.

Figure 6:
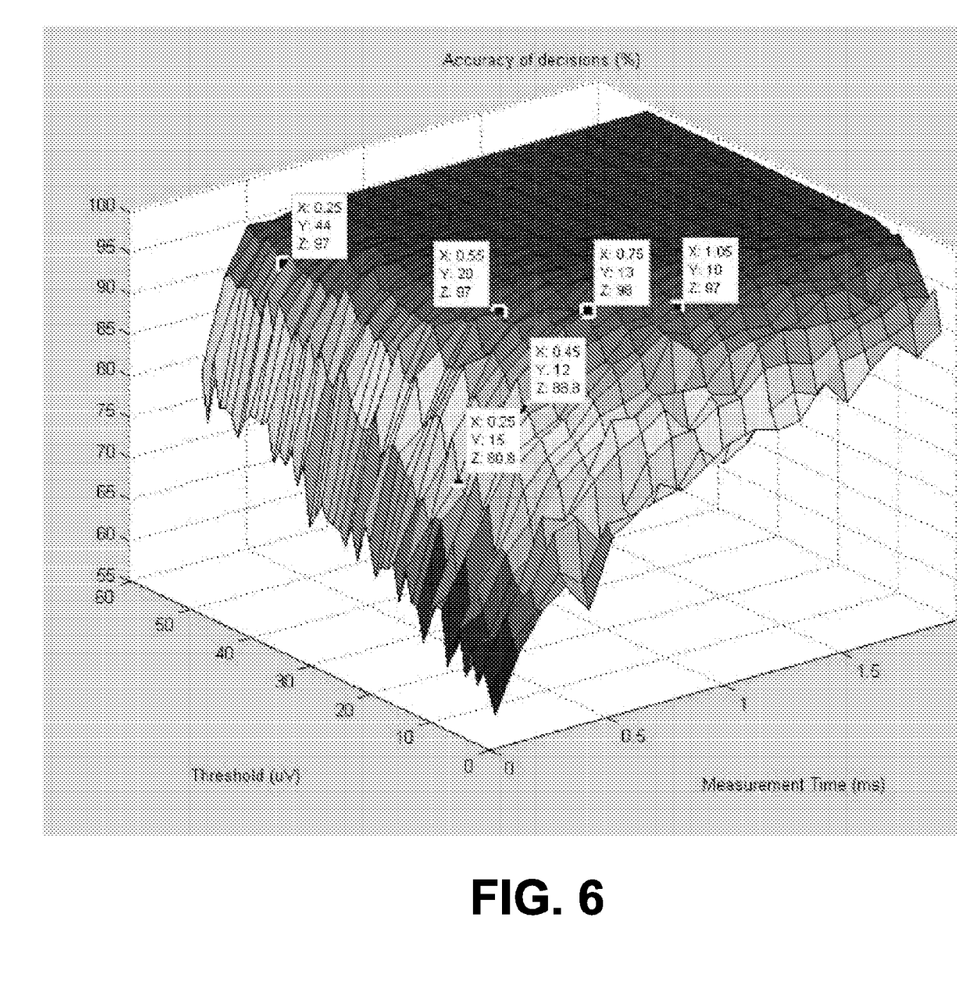
FIG. 6-8 are graphs showing exemplary performance characteristics.
Figure 7:
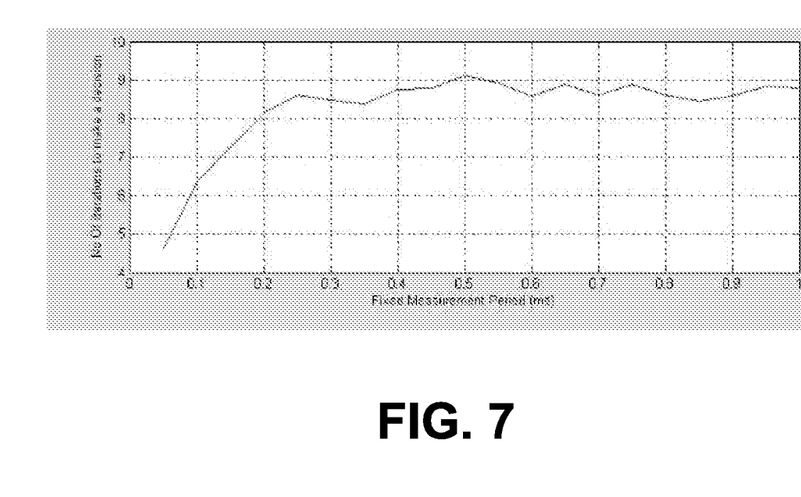
Figure 8:
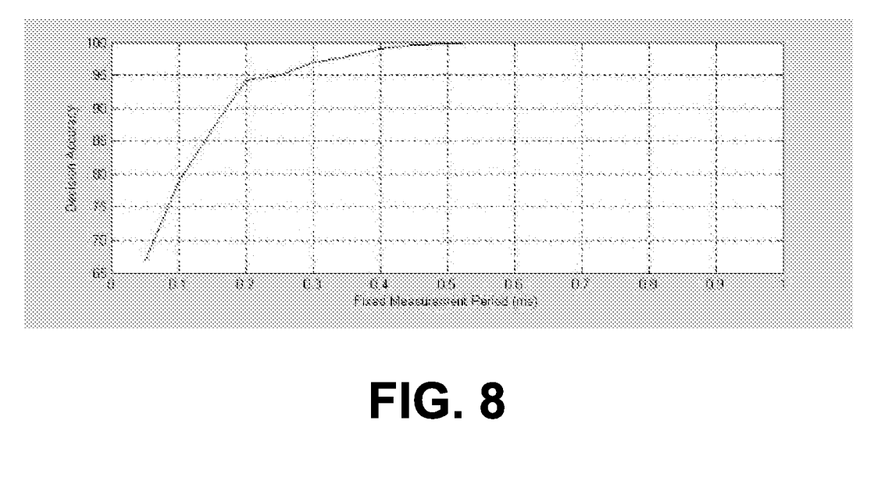

FIGS. 6-8 are graphs showing exemplary performance characteristics when the implementation of FIG. 3 is employed.

For instance, FIG. 6 is a graph showing decision accuracy as a function of measurement period and threshold value. A decision is an adjustment of a correction signal. Thus, a decision occurs when either of the thresholds of comparators 308 and 310 is exceeded. Such a decision is considered accurate when the resulting correction signal adjustment (e.g., adjustment of correction signal 124a or correction signal 124b) provides a DC offset reduction.

A measurement period refers to the integration time employed by first integrator 304, while threshold value refers to the threshold magnitudes employed by comparators 308 and 310. In this case, comparators 308 and 310 employ the same threshold magnitude (one being positive and the other being negative). Embodiments, however, are not limited to employing such equal magnitude thresholds. The results of FIG. 6 were generated through simulation when a DC offset of 6 microvolts was applied to a baseband signal (e.g., baseband signal 122a or 122b).

FIG. 7 is a graph showing a number of iterations needed to make a decision as a function of measurement period. In the context of FIG. 3, the number of iterations refers to the number of integrations performed by first integrator 304. For FIG. 7, a DC offset of 6 microvolts and a threshold magnitude of 40 microvolts are employed.

FIG. 8 is a graph showing decision accuracy as a function of measurement period. For FIG. 8, a DC offset of 6 microvolts and a threshold magnitude 40 microvolts are employed.

Figure 9:
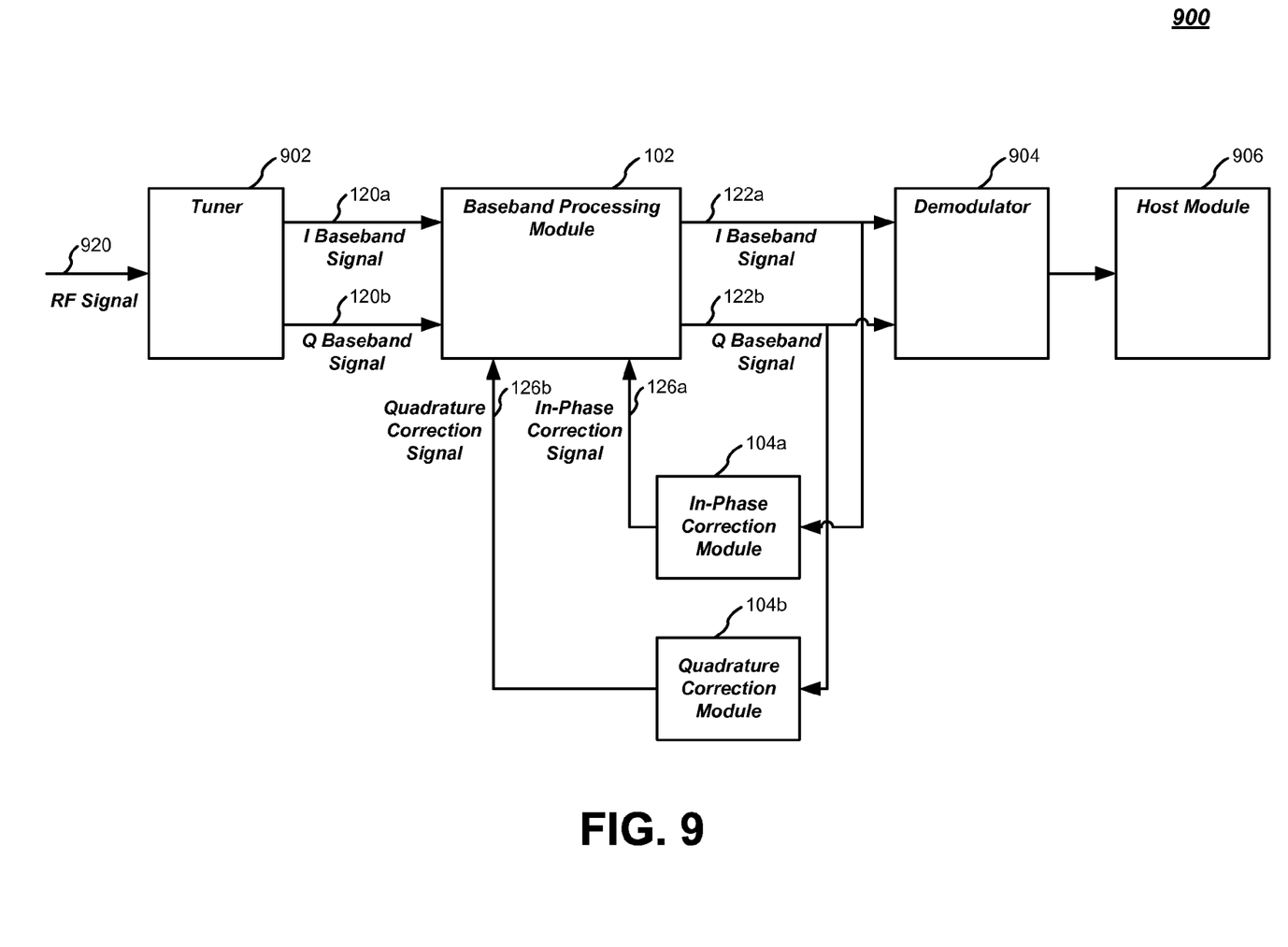
FIG. 9 is a diagram of an exemplary system.

FIG. 9 is a diagram of an exemplary system 900. This system includes the elements of FIG. 1. In addition, system 900 includes a tuner 902, a demodulator 904, and a host module 906. These elements may be implemented in any combination of hardware and/or software.

Tuner 902 generates baseband signals 120a and 120b from a received RF signal 920. This generation may include various operations, including (but not limited to) any combination of downconversion, filtering, and/or amplification.

As described above with reference to FIG. 1, baseband processing module 102 produces baseband signals 122a-b from baseband signal 120a-b. Also, in conjunction with correction modules 104a and 104b, DC offsets of baseband signals 122a-b may be advantageously reduced.

As shown in FIG. 9, demodulator 904 receives baseband signals 122a and 122b. From these symbols, demodulator 904 produces a symbol stream 922. In producing symbol stream 922, demodulator 904 may employ various QAM demodulation schemes.

Host module 906 may process symbol stream 922 in accordance with one or more protocols. In embodiments, such protocol(s) may include user applications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a storage medium or article which is machine readable. The storage medium may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

As described herein, embodiments may include storage media or machine-readable articles. These may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method, comprising:
receiving a baseband signal;
determining a direct current (DC) characteristic of the baseband signal;
generating a correction signal when the DC characteristic has a value that is outside of a predetermined range, the predetermined range having a lower threshold and an upper threshold, wherein the generating comprises:
determining a step size based at least in part on a predetermined number of consecutive increases or decreases of a counter value with respect to the upper threshold or the lower threshold, respectively; and
adjusting the correction signal based at least in part on the step size; and
injecting the correction signal into the baseband signal; and
wherein determining the DC characteristic comprises:
integrating the baseband signal over a first integration time into a DC error signal, the first integration time based at least in part on a measurement period; and
accumulating the DC error signal into the DC characteristic over a second integration time based at least in part on the predetermined range.

2. The method of claim 1, wherein generating the correction signal comprises:
incrementing the counter value when the accumulated error signal is greater than the upper threshold; and
decrementing the counter value when the accumulated error signal is less than the lower threshold.

3. The method of claim 1, wherein generating the correction signal comprises:
setting a value of the correction signal based on the counter value.

4. The method of claim 3, wherein said setting the value of the correction signal based on the counter value comprises performing a digital-to-analog conversion of the counter value.

5. The method of claim 1, wherein injecting the correction signal into the baseband signal comprises:
combining the correction signal with a signal corresponding to the baseband signal.

6. The method of claim 1, further comprising resetting the DC characteristic in response to said generation of the correction signal.

7. The method of claim 1, wherein the baseband signal is a quadrature amplitude modulated (QAM) signal.

8. The method of claim 1, wherein the accumulation occurs until a magnitude of the DC error signal exceeds the upper threshold or the lower threshold.

9. An apparatus, comprising:
a correction module to determine a DC characteristic of a baseband signal, and to generate a correction signal based at least on the DC characteristic; and
a baseband processing module to inject the correction signal into the baseband signal,
wherein, when the DC characteristic has a value that is outside of a predetermined range, the correction module is to adjust the correction signal;
wherein the generation comprises:
determining a step size based at least in part on a predetermined number of consecutive increases or decreases of a counter value with respect to an upper threshold or a lower threshold, respectively, associated with the predetermined range; and
adjusting the correction signal based at least in part on the step size; and
wherein determining the DC characteristic comprises:
integrating, by a first integrator, the baseband signal over a first integration time into a DC error signal, the first integration time based at least in part on a measurement period; and
accumulating, by a second integrator, the DC error signal into the DC characteristic over a second integration time based at least in part on the predetermined range.

10. The apparatus of claim 9 wherein the correction module further includes a counter having the counter value.

11. The apparatus of claim 10, wherein the counter is further configured to increase the counter value when the DC characteristic is greater than the upper threshold, and decrease the correction signal when the DC characteristic is less than the lower threshold.

12. The apparatus of claim 9, wherein the correction module further includes a digital-to-analog converter (DAC) to generate the correction signal from the counter value.

13. The apparatus of claim 9, wherein the correction module is further configured to reset the DC characteristic in response to said adjustment of the correction signal.

14. The apparatus of claim 9, wherein the baseband processing module further includes a node to combine the correction signal with a signal corresponding to the baseband signal.

15. The apparatus of claim 9, wherein the baseband signal further comprises a quadrature amplitude modulated (QAM) signal.

16. The apparatus of claim 9, wherein the accumulation occurs until a magnitude of the DC error signal exceeds the upper threshold or the lower threshold.

17. A system, comprising:
a tuner to generate a first baseband signal from a radio frequency (RF) signal;
a baseband processing module to generate a second baseband signal from the first baseband signal; and
a correction module to determine a DC characteristic of the second baseband signal, and to generate a correction signal based at least on the DC characteristic having a value that is outside of a predetermined range, wherein the generation comprises:
determining a step size based at least in part on a predetermined number of consecutive increases or decreases of a counter value with respect to an upper threshold or a lower threshold, respectively, associated with the predetermined range; and
adjusting the correction signal based at least in part on the step size; and
wherein determining the DC characteristic comprises:
integrating, by a first integrator, the baseband signal over a first integration time into a DC error signal, the first integration time based at least in part on a measurement period; and
accumulating, by a second integrator, the DC error signal into the DC characteristic over a second integration time based at least in part on the predetermined range;
wherein the baseband processing module is to inject the correction signal into the second baseband signal.

18. The system of claim 17, further comprising:
a demodulator to generate a symbol stream based at least in part on the second baseband signal.

19. The system of claim 18, further comprising:
a host module to process the symbol stream in accordance with one or more protocols.

20. The system of claim 17, wherein the correction module includes:
a counter having the counter value, wherein the counter is to increase the counter value when the DC characteristic is greater than the upper threshold, and decrease the correction signal when the DC characteristic is less than the lower threshold.

* * * * *